United States Patent
Tanaka (10) Patent No.: US 12,183,890 B2
(45) Date of Patent: Dec. 31, 2024

(54) ALL-SOLID-STATE SECONDARY BATTERY

(71) Applicant: TDK CORPORATION, Tokyo (JP)

(72) Inventor: Kazumasa Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 612 days.

(21) Appl. No.: 17/435,470

(22) PCT Filed: Mar. 16, 2020

(86) PCT No.: PCT/JP2020/011337
§ 371 (c)(1),
(2) Date: Sep. 1, 2021

(87) PCT Pub. No.: WO2020/189599
PCT Pub. Date: Sep. 24, 2020

(65) Prior Publication Data
US 2022/0052383 A1 Feb. 17, 2022

(30) Foreign Application Priority Data
Mar. 15, 2019 (JP) .................................. 2019-048907

(51) Int. Cl.
*H01M 10/0585* (2010.01)
*H01M 50/545* (2021.01)
*H01M 50/548* (2021.01)

(52) U.S. Cl.
CPC ..... *H01M 10/0585* (2013.01); *H01M 50/545* (2021.01); *H01M 50/548* (2021.01)

(58) Field of Classification Search
CPC ........... H01M 10/0585; H01M 50/545; H01M 50/548
See application file for complete search history.

(56) References Cited

U.S. PATENT DOCUMENTS

| 2007/0231704 A1 | 10/2007 | Inda |
| 2007/0259271 A1 | 11/2007 | Nanno et al. |
| 2014/0072864 A1* | 3/2014 | Suzuta ................... B32B 15/20 |
| | | 29/623.2 |

FOREIGN PATENT DOCUMENTS

| JP | 2007-005279 A | 1/2007 |
| JP | 2007-294429 A | 11/2007 |
| WO | 2013/175993 A1 | 11/2013 |

OTHER PUBLICATIONS

Jun. 16, 2020 Search Report issued in International Patent Application No. PCT/JP2020/011337.

* cited by examiner

*Primary Examiner* — Karie O'Neill Apicella
(74) *Attorney, Agent, or Firm* — Oliff PLC (57) ABSTRACT

An all-solid-state secondary battery includes a laminated body in which a positive electrode layer and a negative electrode layer are laminated via a solid electrolyte layer, a first external terminal, and a second external terminal, the laminated body has a first side surface parallel to a laminating direction and a second side surface parallel to the laminating direction and perpendicular to the first side surface, the first external terminal and the second external terminal are connected to the first side surface, and the laminated body has a warp in the laminating direction satisfying Equations (1) and (2):

$$0.5° \leq ((A1+A2)/2) \leq 5° \quad (1)$$

$$A1 \leq 8.0° \quad (2)$$

here, A1 is a warp angle of the laminated body when seen from a side of the first side surface, and A2 is a warp angle of the laminated body when seen from a side of the second side surface.

3 Claims, 3 Drawing Sheets

ALL-SOLID-STATE SECONDARY BATTERY

TECHNICAL FIELD

The present invention relates to an all-solid-state secondary battery.

Priority is claimed on Japanese Patent Application No. 2019-048907, filed Mar. 15, 2019, the content of which is incorporated herein by reference.

BACKGROUND ART

In recent years, development of electronics technology has been remarkable, and portable electronic devices have been made smaller, lighter, thinner, and more multifunctional. Along with this, it is strongly desired to reduce the size, weight, thickness, and reliability of a battery, which is a power supply of an electronic device. Currently, lithium ion secondary batteries, which are widely used, have conventionally used an electrolyte (electrolytic solution) such as an organic solvent or the like as a medium for moving ions. However, in the battery with the above-mentioned configuration, the electrolytic solution may leak.

Since the organic solvent or the like used in the electrolytic solution is a flammable material, it is required to further improve safety of the battery. Here, as one measure to improve the safety of the battery, it has been proposed to use a solid electrolyte as the electrolyte, instead of the electrolytic solution. Further, in addition to using the solid electrolyte as the electrolyte, an all-solid-state battery constituted by other components that are also solids is under development.

For example, Patent Literature 1 discloses an all-solid-state lithium secondary battery, all components of which are formed of solids using a noninflammable solid electrolyte. A laminated body for the all-solid-state lithium secondary battery includes an active material layer and a solid electrolyte layer sintered and bonded to the active material layer, the active material layer contains a first crystalline material that can release and occlude lithium ions, and the solid electrolyte layer contains a second crystalline material having lithium ion conductivity. Patent Literature 1 discloses that a filling rate of the solid electrolyte layer preferably exceeds 70%.

Meanwhile, Patent Literature 2 discloses a lithium ion conductive solid electrolyte in which a molded body containing an inorganic powder is fired and a porosity is equal to or smaller than 10 vol %.

As disclosed in Patent Literature 1 and Patent Literature 2, it is generally preferable for the solid electrolyte constituting an all-solid-state battery to be dense.

CITATION LIST

Patent Literature

[Patent Literature 1]
Japanese Unexamined Patent Application, First Publication No. 2007-5279
[Patent Literature 2]
Japanese Unexamined Patent Application, First Publication No. 2007-294429
[Patent Literature 3]
PCT International Publication No. 2013/175993

SUMMARY OF INVENTION

Technical Problem

However, as disclosed in Patent Literature 1 and Patent Literature 2, in the all-solid-state battery in which the solid electrolyte layer is dense, internal stress may be concentrated in the solid electrolyte layer, and cracks may occur due to expansion and contraction of a volume of the electrode layer generated upon charge and discharge of the all-solid-state battery. It was found that this results in an increase in the internal resistance and deterioration of cycling characteristics.

To solve such problems, Patent Literature 3 discloses a solid electrolyte layer in which a portion with low porosity is formed in a region close to the electrode layer of the solid electrolyte layer and a portion with high porosity is formed in a region separated from the electrode layer. However, according to the inventor's examination, as disclosed in Patent Literature 3, when the portions with the high and low porosity were formed in the solid electrolyte layer, an internal resistance of the solid electrolyte layer was further increased, and sufficient cycling characteristics could not be obtained.

The present invention is directed to providing an all-solid-state secondary battery having good cycling characteristics by providing a warp of a predetermined angle.

Solution to Problem

In order to achieve the aforementioned objects, the present invention provides the following means.

(1) An all-solid-state secondary battery according to a first aspect of the present invention includes a laminated body in which a positive electrode layer having a positive electrode current collector layer and a positive electrode active material layer, and a negative electrode layer having a negative electrode current collector layer and a negative electrode active material layer are laminated within a solid electrolyte layer, a first external terminal, and a second external terminal, the laminated body has a first side surface parallel to a laminating direction and a second side surface parallel to the laminating direction and perpendicular to the first side surface, the first external terminal and the second external terminal are connected to the first side surface, and the laminated body has a warp that is warped in the laminating direction and satisfies Equations (1) and (2);

$$0.5° \leq ((A1+A2)/2) \leq 5° \quad (1)$$

$$A1 \leq 8.0° \quad (2),$$

Here, A1 is an angle of the warp of the laminated body when seen from a side of the first side surface, and A2 is an angle of the warp of the laminated body when seen from a side of the second side surface.

(2) In the all-solid-state secondary battery according to the above-mentioned (1), Equation (3) may be satisfied:

$$0.5° \leq ((A1+A2)/2) \leq 4° \quad (3).$$

Advantageous Effects of Invention

According to the present invention, it is possible to provide an all-solid-state secondary battery having good cycling characteristics by providing a warp of a predetermined angle.

DESCRIPTION OF EMBODIMENTS

Hereinafter, an embodiment of the present invention will be described in detail with reference to the accompanying drawings. In the drawings used in the following description, in order to make features of the embodiment easier to understand, feature parts may be enlarged for convenience, and dimensional ratios of the components may differ from actual ones. Materials, dimensions, and the like exemplified in the following description are examples, and the embodiment is not limited thereto and can be appropriately modified and implemented within a range in which the present invention is effective.

As an all-solid-state secondary battery, an all-solid-state lithium ion secondary battery, an all-solid-state sodium ion secondary battery, an all-solid-state magnesium ion secondary battery, or the like is exemplified. While an all-solid-state lithium ion secondary battery is described below as an example, the present invention can be generally applied to all-solid-state secondary batteries.

Figure 1:
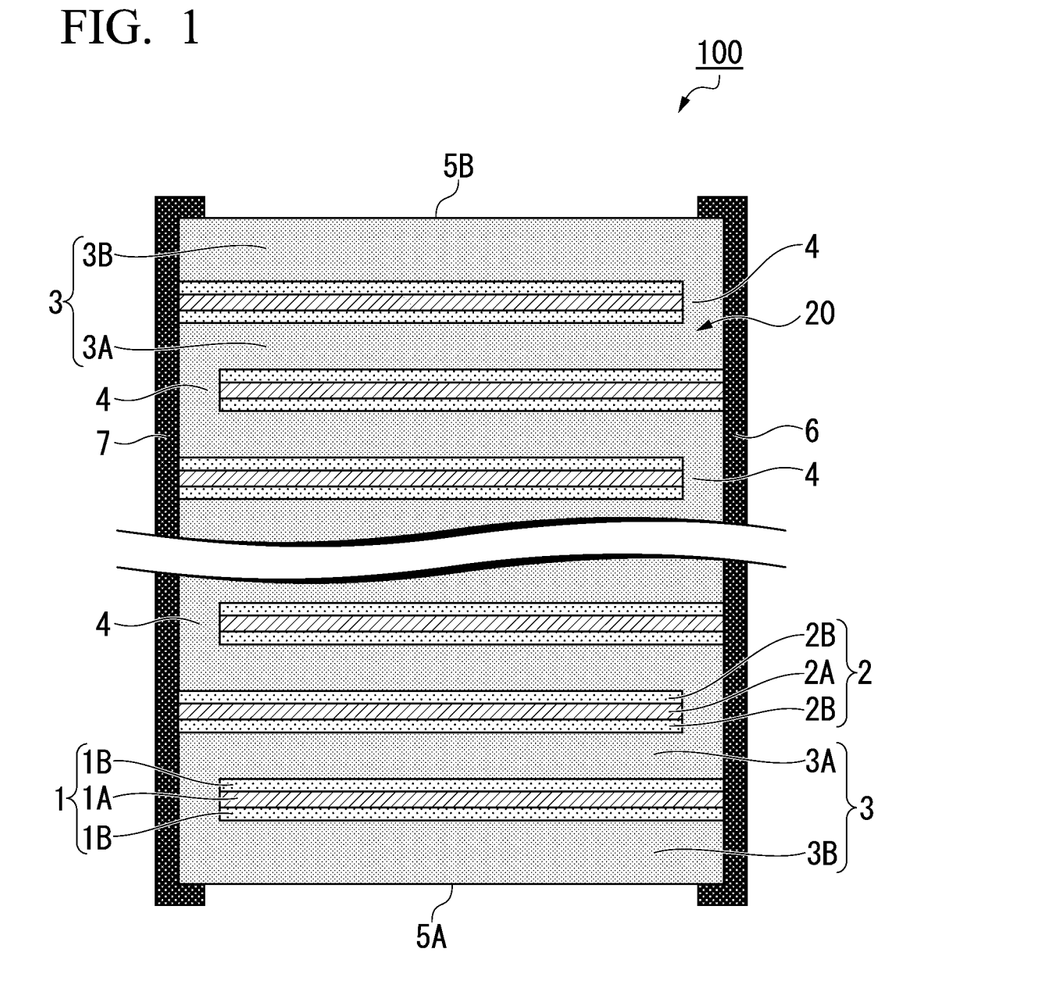
FIG. 1 is a schematic cross-sectional view of an all-solid-state secondary battery according to an embodiment.

FIG. 1 is a schematic cross-sectional view of an enlarged major part of an all-solid-state lithium ion secondary battery according to an embodiment.

The all-solid-state lithium ion secondary battery shown in FIG. 1 includes a laminated body having a first electrode layer, a second electrode layer, and a solid electrolyte layer. Hereinafter, any one of the first electrode layer and the second electrode layer functions as a positive electrode, and the other functions as a negative electrode. The positive and negative of the electrode layer change depending on which polarity is connected to an external terminal. Hereinafter, for ease of understanding, the first electrode layer will be referred to as a positive electrode layer, and the second electrode layer will be referred to as a negative electrode layer.

The all-solid-state lithium ion secondary battery 100 has positive electrode layers 1 including positive electrode current collector layers 1A and positive electrode active material layers 1B, negative electrode layers 2 including negative electrode current collector layers 2A and negative electrode active material layers 2B, and the solid electrolyte layer 3 including a solid electrolyte, and is provided with a laminated body 20 in which the positive electrode layers 1 and the negative electrode layers 2 are alternately laminated via the solid electrolyte layer 3.

The positive electrode layers 1 are connected to a first external terminal 6, and the negative electrode layers 2 are connected to a second external terminal 7. The first external terminal 6 and the second external terminal 7 are electric contacts with the outside.

(Laminated Body)

The laminated body 20 has the positive electrode layers 1, the negative electrode layers 2, and the solid electrolyte layer 3.

The positive electrode layers 1 and the negative electrode layers 2 are alternately laminated via the solid electrolyte layer 3 (more specifically, an interlayer solid electrolyte layer 3A) in the laminated body 20. Charge and discharge of the all-solid-state lithium ion secondary battery 100 are performed by exchanging lithium ions between the positive electrode layers 1 and the negative electrode layers 2 via the solid electrolyte layer 3.

While the numbers of the positive electrode layers 1 and the negative electrode layers 2 that are stacked is not limited, the total number of the positive electrode layers 1 and the negative electrode layers 2 is generally within a range of 10 layers or more and 200 layers or less, preferably within a range of 20 layers or more and 100 layers or less.

The laminated body 20 is substantially hexahedron-shaped, and has four side surfaces (a first side surface 21, a second side surface 22, a first side surface 23, and a second side surface 24) formed as surfaces parallel to a laminating direction (a z direction in FIG. 2), and an upper surface formed on an upper side and a lower surface formed on a lower side, which are surfaces substantially perpendicular to the laminating direction.

Figure 2:
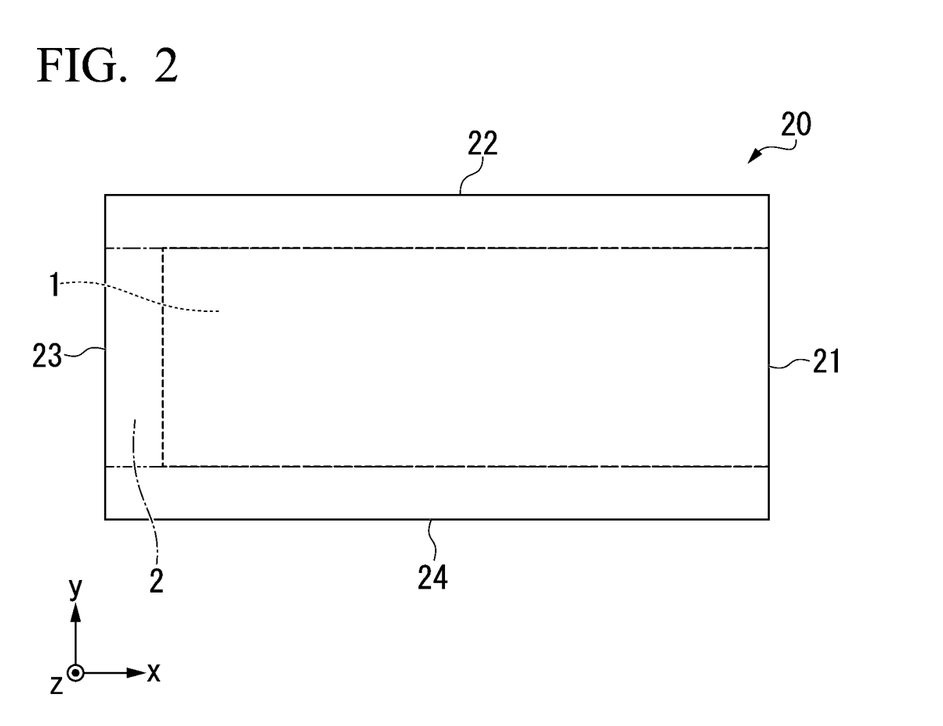
FIG. 2 is a plan view of a laminated body according to the embodiment.

The first side surface is a surface on which the electrode layers are exposed, and in the example shown in FIGS. 1 and 2, the positive electrode layers 1 are exposed on the first side surface 21 and the negative electrode layers 2 are exposed on the first side surface 23. The second side surface is a side surface on which the electrode layers are not exposed. The second side surface 22 is a right side surface when seen from the side of the first side surface 21 while an upper surface is directed upward, and a side surface parallel in the laminating direction and substantially perpendicular to the first side surface 21 and the first side surface 23. In addition, the second side surface 24 is a left side surface when seen from the side of the first side surface 21 while an upper surface is directed upward, and a side surface parallel to the laminating direction and substantially perpendicular to the first side surface 21 and the first side surface 23.

Here, in a warp of the laminated body described below, any one of the first side surface 21 and the first side surface 23 may be selected as the first side surface, and further, any one of the second side surface 22 and the second side surface 24 may be selected as the second side surface.

(Warp of Laminated Body)

The laminated body 20 has the first side surface 21 (or the first side surface 23) parallel to the laminating direction and the second side surface 22 (or the second side surface 24) parallel to the laminating direction (a z direction) and perpendicular to the first side surface 21, and has a warp that is warped in the laminating direction and satisfies Equations (1) and (2);

$$0.5° \leq ((A1+A2)/2) \leq 5° \tag{1}$$

$$A1 \leq 8.0° \tag{2},$$

Here, A1 is an angle of the warp of the laminated body 20 when seen from the side of the first side surface 21 (or the first side surface 23), and A2 is an angle of the warp of the laminated body 20 when seen from the side of the second side surface 22 (or the second side surface 24).

Figure 3:
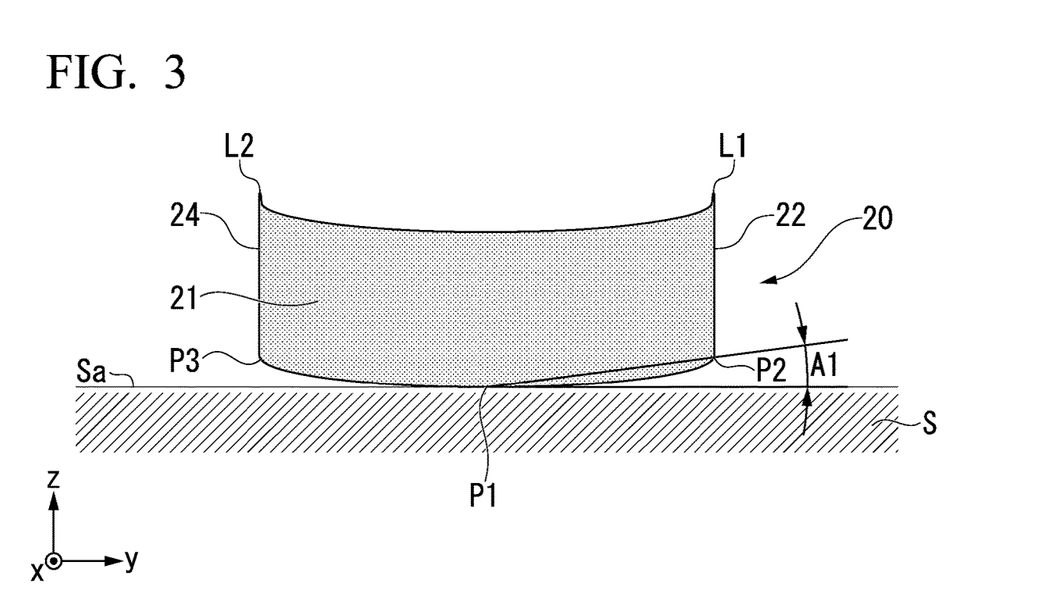
FIG. 3 is a schematic view for describing definition of an angle A1 of a warp, schematically showing the laminated body from a side of a first side surface.

FIG. 3 is a schematic view for describing definition of the angle A1 of the warp, schematically showing the laminated body 20 when seen from the side of the first side surface 21.

The angle A1 of the warp of the laminated body 20 when seen from the side of the first side surface 21 will be described using FIG. 3. The laminated body 20 is placed such that a convex side in the z direction is directed toward a flat stand S.

P1 is a point in contact with a surface Sa of the flat stand S on the first side surface 21 or a point closest to the surface Sa of the flat stand S in the first side surface 21, and P2 is a point closest to the surface Sa of the flat stand S on a side L1 shared by the first side surface 21 and the second side surface 22.

An angle created by the surface Sa of the flat stand S and a line segment connecting P1 and P2 is the angle A1 of the warp of the laminated body 20.

Instead of P2, using a point P3 closest to the surface Sa of the flat stand S in a side L2 shared by the first side surface 21 and the second side surface 24, an angle created by the surface Sa of the flat stand S and a line segment connecting P1 and P3 may be the angle A1 of the warp of the laminated body 20. When an angle created by the line segment connecting P1 and P2 and an angle created by the line segment connecting P1 and P3 are different from each other, the angle created by the line segment having a larger angle is the angle A1 of the warp of the laminated body 20.

Figure 4:
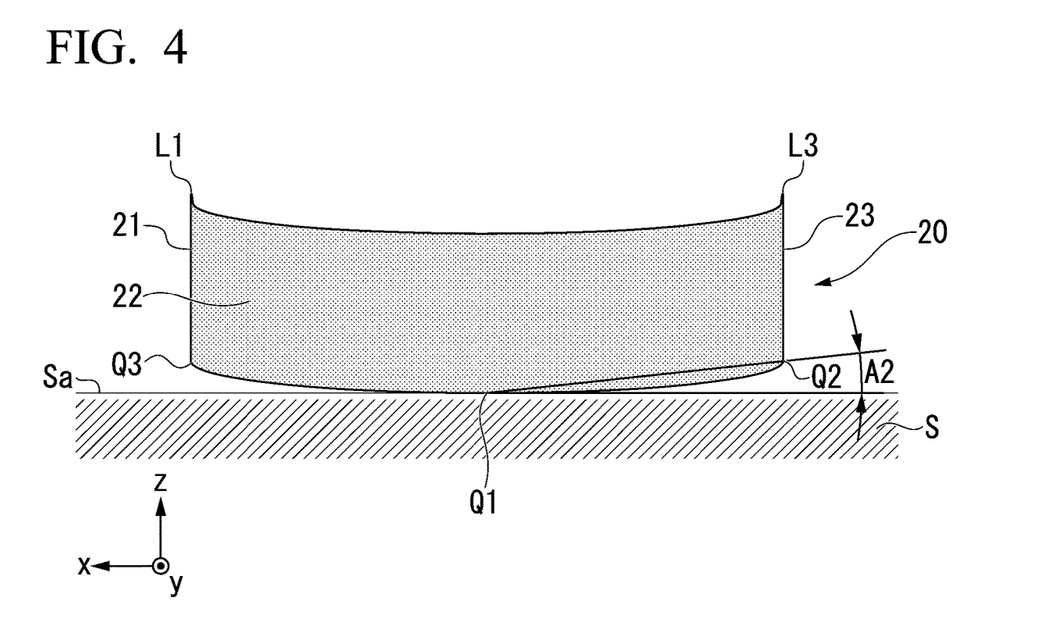
FIG. 4 is a schematic view for describing definition of an angle A2 of the warp, schematically showing the laminated body from a side of a second side surface.

FIG. 4 is a schematic view for describing definition of the angle A2 of the warp, schematically showing the laminated body 20 when seen from the side of the second side surface 22.

The angle A2 of the warp of the laminated body 20 when seen from the side of the second side surface 22 will be described using FIG. 4. The laminated body 20 is placed such that a convex side in the z direction is directed toward the flat stand S.

Q1 is a point in contact with the surface Sa of the flat stand S in the second side surface 22 or a point closest to the surface Sa of the flat stand S in the second side surface 22, and Q2 is a point closest to the surface Sa of the flat stand S in a side L3 shared by the second side surface 22 and the first side surface 23.

An angle created by the surface Sa of the flat stand and a line segment connecting Q1 and Q2 is the angle A2 of the warp of the laminated body 20.

Instead of Q2, using a point Q3 closest to the surface Sa of the flat stand S in the side L1 shared by the second side surface 22 and the first side surface 21, an angle created by the surface Sa of the flat stand S and a line segment connecting Q1 and Q3 may be the angle A2 of the warp of the laminated body 20. When an angle created by the line segment including Q1 and Q2 and an angle created by the line segment connecting Q1 and Q3 are different from each other, an angle created by the line segment having a larger angle is the angle A2 of the warp of the laminated body 20.

The present inventor found that an all-solid-state battery with good cycling characteristics can be manufactured when the warp of the laminated body satisfies the above-mentioned Equations (1) and (2). While the mechanism through which a configuration in which the warp of the laminated body is within a predetermined range leads to good cycling characteristics is not clear at this time, it is conceivable that, when the laminated body already has the warp within the predetermined range, since expansion and contraction of a volume of the electrode layer generated upon charge and discharge of the all-solid-state battery follow the direction of the warp, stress of the expansion and contraction of the volume is attenuated, and as a result, good cycling characteristics are obtained.

The warp of the laminated body 20 preferably satisfies Equation (3);

$$0.5° \leq ((A1+A2)/2) \leq 4° \quad (3).$$

Better cycling characteristics are obtained when the warp of the laminated body 20 satisfies Equation (3).

The warp of the laminated body 20 more preferably satisfies Equation (4);

$$A1 \leq 4.5° \quad (4).$$

Better cycling characteristics are obtained when the warp of the laminated body 20 satisfies Equation (4).

(Positive Electrode Layers and Negative Electrode Layers)

The positive electrode layers 1 have the positive electrode current collector layers 1A and the positive electrode active material layers 1B containing a positive electrode active material. The negative electrode layers 2 have the negative electrode current collector layers 2A and the negative electrode active material layers 2B containing a negative electrode active material.

The positive electrode current collector layers 1A and the negative electrode current collector layers 2A each include a positive electrode current collector or a negative electrode current collector, a conductance of which is high. As the positive electrode current collector and negative electrode current collector having high conductivity, for example, a metal or an alloy including at least any one metal element of silver (Ag), palladium (Pd), gold (Au), platinum (Pt), aluminum (Al), copper (Cu), and nickel (Ni), or a non-metal such as carbon (C) is exemplified. In these metal elements, in consideration of manufacturing costs in addition to highness of the conductivity, copper or nickel is preferable. Further, copper does not easily react with the positive electrode active material, the negative electrode active material, and the solid electrolyte. For this reason, when copper is used in the positive electrode current collector layers 1A and the negative electrode current collector layers 2A, an internal resistance of the all-solid-state lithium ion secondary battery 100 can be reduced. Materials that constitute the positive electrode current collector layers 1A and the negative electrode current collector layers 2A may be the same as each other or may be different from each other. While thicknesses of the positive electrode current collector layers 1A and the negative electrode current collector layers 2A are not limited, as a guide, the thicknesses are within a range of 0.5 μm or more and 30 μm or less.

The positive electrode active material layers 1B are formed on single surfaces or both surfaces of the positive electrode current collector layers 1A. For example, the negative electrode layers 2 facing an upper side in the laminating direction are not provided on the positive electrode layers 1 disposed on the uppermost layer of the all-solid-state lithium ion secondary battery 100 in the laminating direction. For this reason, the positive electrode active material layer 1B in the positive electrode layer 1 disposed on the uppermost layer of the all-solid-state lithium ion secondary battery 100 may be provided only on the single surface on the lower side in the laminating direction, and there is no particular problem even when it is provided on both surfaces. Like the positive electrode active material layers 1B, the negative electrode active material layers 2B are also formed on the single surfaces or both surfaces of the negative electrode current collector layers 2A. The thicknesses of the positive electrode active material layers 1B and the negative electrode active material layers 2B are preferably within a range of 0.5 μm or more and 5.0 μm or less. When the thicknesses of the positive electrode active material layers 1B and the negative electrode active material layers 2B are 0.5 μm or more, an electric capacity of the all-solid-state lithium ion secondary battery can be increased, whereas, when the thicknesses are 5.0 μm or less, since a diffusion length of lithium ions is decreased, the internal resistance of the all-solid-state lithium ion secondary battery can be further reduced.

The positive electrode active material layers 1B and the negative electrode active material layers 2B each include a positive electrode active material or a negative electrode active material that transfers lithium ions and electrons. In addition, a conductive assistant or the like may be included. It is preferable that the positive electrode active material and the negative electrode active material be able to efficiently insert and remove lithium ions.

There is no clear distinction between the active materials that constitute the positive electrode active material layers 1B or the negative electrode active material layers 2B, and by comparing potentials of two types of compounds, the compound showing more noble potential can be used as the positive electrode active material, and the compound showing lesser potential can be used as the negative electrode active material. For this reason, the active materials will be described together below.

A transition metal oxide, a transition metal composite oxide, or the like can be used in the active materials. For example, as the transition metal oxide or the transition metal composite oxide, a lithium manganese composite oxide $Li_2Mn_aMa_{1-a}O_3$ ($0.8 \leq a \leq 1$, Ma=Co, Ni), lithium cobalt oxide ($LiCoO_2$), lithium nickel oxide ($LiNiO_2$), lithium manganese spinel ($LiMn_2O_4$), a composite metal oxide expressed by a general formula: $LiNi_xCo_yMn_zO_2$ ($x+y+z=1$, $0 \leq x \leq 1$, $0 \leq y \leq 1$, $0 \leq z \leq 1$), a lithium vanadium compound ($LiV_2O_5$), olivine type $LiM_bPO_4$ (where Mb is one or more elements selected from the group consisting of Co, Ni, Mn, Fe, Mg, Nb, Ti, Al, and Zr), vanadium lithium phosphate ($Li_3V_2(PO_4)_3$ or $LiVOPO_4$), a Li-excess solid solution positive electrode expressed by $Li_2MnO_3$—$LiM_cO_2$ ($M_c$=Mn, Co, Ni), lithium titanate ($Li_4Ti_5O_{12}$), a composite metal oxide expressed by $Li_sNi_tCo_uAl_vO_2$ ($0.9<s<1.3$, $0.9<t+u+v<1.1$), or the like is exemplified.

The positive electrode current collector layers 1A and the negative electrode current collector layers 2A may include a positive electrode active material and a negative electrode active material, respectively. A content ratio of the active material contained in each of the current collector layers is not particularly limited as long as it functions as the current collector. For example, it is preferable that the positive electrode current collector/the positive electrode active material or the negative electrode current collector/the negative electrode active material have a volume ratio within a range of 90/10 to 70/30.

Since the positive electrode current collector layers 1A and the negative electrode current collector layers 2A include the positive electrode active material and the negative electrode active material, respectively, adhesion between the positive electrode current collector layers 1A and the positive electrode active material layers 1B, and between the negative electrode current collector layers 2A and the negative electrode active material layers 2B is improved.

(Solid Electrolyte Layer)

As shown in FIG. 1, the solid electrolyte layer 3 has the interlayer solid electrolyte layer 3A disposed between the positive electrode active material layer 1B and the negative electrode active material layer 2B.

The solid electrolyte layer 3 may further have an outermost solid electrolyte layer 3B disposed on an outer side of any one or both (both in FIG. 1) of the positive electrode layer 1 (the positive electrode current collector layer 1A) and the negative electrode layer 2 (the negative electrode current collector layer 2A). Here, the "outer side" means an outer side of the positive electrode layer 1 or the negative electrode layer 2 closest to surfaces 5A and 5B of the laminated body 20.

Further, the solid electrolyte layer 3 may not have the outermost solid electrolyte layer 3B, and in this case, the surfaces 5A and 5B of the laminated body 20 are the positive electrode layer 1 and the negative electrode layer 2.

It is preferable to use a material having a low electron conductivity and a high lithium ion conductivity in the solid electrolyte layer 3. The solid electrolyte layer 3 is desirably at least one selected from the group consisting of a Perovskite type compound such as $La_{0.5}Li_{0.5}TiO_3$ or the like, a Lisicon type compound such as $Li_{14}Zn(GeO_4)_4$ or the like, a Garnet type compound such as $Li_7La_3Zr_2O_{12}$ or the like, a Nasicon type compound such as $LiZr_2(PO_4)_3$, $Li_{1.3}Al_{0.3}Ti_{1.7}(PO_4)_3$, $Li_{1.5}Al_{0.5}Ge_{1.5}(PO_4)_3$, or the like, a Thio-Lisicon type compound such as $Li_{3.25}Ge_{0.25}P_{0.75}S_4$, $Li_3PS_4$, or the like, a glass compound such as $Li_2S$—$P2S_5$, $Li_2O$—$V_2O_5$—$SiO_2$, or the like, and a phosphate compound such as $Li_3PO_4$, $Li_{3.5}Si_{0.5}P_{0.5}O_4$, $Li_{2.9}PO_{3.3}N_{0.46}$, or the like.

The solid electrolyte layer 3 is preferably selected according to the active material used in the positive electrode layer 1 and the negative electrode layer 2. For example, the solid electrolyte layer 3 more preferably includes the same element as the element that constitutes the active material. Since the solid electrolyte layer 3 includes the same element as the element that constitutes the active material, bonding in the interface between the positive electrode active material layer 1B and the negative electrode active material layer 2B and the solid electrolyte layer 3 is strengthened. In addition, a contact area in the interface between the positive electrode active material layer 1B and the negative electrode active material layer 2B and the solid electrolyte layer 3 can be increased.

The thickness of the interlayer solid electrolyte layer 3A is preferably within a range of 0.5 μm or more and 20.0 μm or less. Since a short circuit between the positive electrode layer 1 and the negative electrode layer 2 can be reliably prevented when the thickness of the interlayer solid electrolyte layer 3A is 0.5 μm or more and a moving distance of the lithium ion is decreased when the thickness is 20.0 μm or less, the internal resistance of the all-solid-state lithium ion secondary battery can be further reduced.

While the thickness of the outermost solid electrolyte layer 3B is not particularly limited, for example, it may be a thickness of 1% to 40% of the thickness of the laminated body 20. Like a margin layer described below, since the outermost solid electrolyte layer 3B is provided, the solid electrolyte layer 3 and the electrode layers can be physically and chemically protected, and durability or moisture resistance can be improved.

(Margin Layer)

As shown in FIG. 1, the laminated body 20 contains the solid electrolyte and may include a margin layer 4 disposed in line with each of the positive electrode layer 1 and the negative electrode layer 2. The solid electrolyte contained in the margin layer 4 may be the same as or may be different from the solid electrolyte contained in the solid electrolyte layer 3.

It is preferable that the margin layer 4 is provided to eliminate a step difference between the interlayer solid electrolyte layer 3A and the positive electrode layer 1 and a step difference between the interlayer solid electrolyte layer 3A and the negative electrode layer 2. Accordingly, the margin layer 4 is formed at substantially the same height as the positive electrode layer 1 or the negative electrode layer 2 (i.e., to be disposed in line with each of the positive electrode layer 1 and the negative electrode layer 2) in a region other than the positive electrode layer 1 and the negative electrode layer 2 in a main surface of the solid electrolyte layer 3. Since the step differences between the solid electrolyte layer 3 and the positive electrode layer 1 and between the solid electrolyte layer 3 and the negative electrode layer 2 are resolved due to presence of the margin layer 4, the compactness between the solid electrolyte layer 3 and the electrode layers is increased, and interlayer separation (delamination) or a warp due to firing of the all-solid-state battery is less likely to occur.

The material that constitutes the margin layer 4 is desirably at least one selected from the group consisting of, for example, a Perovskite type compound such as $La_{0.5}Li_{0.5}TiO_3$ or the like, a Lisicon type compound such as $Li_{14}Zn(GeO_4)_4$ or the like, a Garnet type compound such as $Li_7La_3Zr_2O_{12}$ or the like, a Nasicon type compound such as $LiZr_2(PO_4)_3$, $Li_{1.3}Al_{0.3}Ti_{1.7}(PO_4)_3$, $Li_{1.5}Al_{0.5}Ge_{1.5}(PO_4)_3$, or the like, a Thio-Lisicon type compound such as $Li_{3.25}Ge_{0.25}P_{0.75}S_4$, $Li_3PS_4$, or the like, a glass compound such as $Li_2S$—$P_2S_5$, $Li_2O$—$V_2O_5$—$SiO_2$, or the like, and a phosphate compound such as $Li_3PO_4$, $Li_{3.5}Si_{0.5}P_{0.5}O_4$, $Li_{2.9}PO_{3.3}N_{0.46}$, or the like.

(Terminal)

A material with high conductance is preferably used in the first external terminal 6 and the second external terminal 7 of the all-solid-state lithium ion secondary battery 100. For example, silver (Ag), gold (Au), platinum (Pt), aluminum (Al), copper (Cu), tin (Sn), nickel (Ni), chromium (Cr), or the like, can be used. The terminal may be constituted by a single layer or a plurality of layers.

(Protective Layer)

The all-solid-state lithium ion secondary battery 100 may have a protective layer (not shown) configured to electrically, physically, or chemically protect the laminated body 20 or the terminal on an outer circumference of the laminated body 20. As a material that constitutes the protective layer, it is preferable that the material has excellent insulation, durability, and moisture resistance and is environmentally safe. For example, it is preferable to use glass, ceramics, a thermosetting resin, a photo-curing resin, or the like. Only one type of material of the protective layer may be used or a plurality of materials may be used in combination. In addition, the protective layer may be a single layer, but it is preferable to have a plurality of layers. Among them, an organic/inorganic hybrid in which a thermosetting resin and a ceramics powder are mixed is particularly preferable.

(Method of Manufacturing all-Solid-State Lithium Ion Secondary Battery)

A method of manufacturing the all-solid-state lithium ion secondary battery 100 can use a simultaneous firing method. This is a method of fabricating laminated bodies through batch firing of different materials of the active material layer, the current collector layer, and the solid electrolyte layer that constitute the laminated body 20. When the simultaneous firing method is used, a working process of the all-solid-state lithium ion secondary battery 100 can be reduced. In addition, the obtained laminated body 20 becomes denser when the simultaneous firing method is used. Hereinafter, an example in which the simultaneous firing method is used will be described.

The simultaneous firing method has a process of fabricating paste of materials that constitute the laminated body 20, a process of fabricating a solid electrolyte layer sheet by applying and drying the paste for a solid electrolyte, a process of fabricating a positive electrode unit and a negative electrode unit by forming a positive electrode layer and a negative electrode layer on the solid electrolyte sheet, a process of fabricating the laminated body by alternately laminating the positive electrode unit and the negative electrode unit, and a process of simultaneously firing the fabricated laminated bodies. Hereinafter, the processes will be described in more detail.

First, materials of the positive electrode current collector layer 1A, the positive electrode active material layer 1B, the solid electrolyte layer 3, the negative electrode active material layer 2B, the negative electrode current collector layer 2A, and the margin layer 4 that constitute the laminated body 20 are pasted.

The pasting method is not particularly limited. For example, powders of the materials are mixed in a vehicle to obtain the paste. Here, the vehicle is a general term for medium in a liquid phase. The vehicle includes a solvent and a binder. By such a method, paste for a positive electrode current collector layer 1A, paste for a positive electrode active material layer 1B, paste for a solid electrolyte layer 3, paste for a negative electrode active material layer 2B, paste for a negative electrode current collector layer 2A, and paste for a margin layer 4 are fabricated.

When the laminated body 20 is fabricated, a positive electrode unit and a negative electrode unit, which will be described, can be prepared, and the laminated body can be fabricated.

First, the paste for a solid electrolyte layer 3 is formed on a PET film in a sheet shape through a doctor blade method, and dried to form the solid electrolyte layer sheet. The paste for a positive electrode active material layer 1B is printed on the obtained solid electrolyte layer sheet through screen printing, and dried to form the positive electrode active material layer 1B.

Next, the paste for a positive electrode current collector layer 1A is printed on the fabricated positive electrode active material layer 1B through screen printing, and dried to form the positive electrode current collector layer 1A. Further, on the top of that, the paste for a positive electrode active material layer 1B is printed again through screen printing, and dried. Then, the margin layer having substantially the same height as the positive electrode layer is formed by printing the paste for a margin layer on the region of the solid electrolyte layer sheet except the positive electrode layer through screen printing and drying the paste. Then, by separating the PET film, a positive electrode unit in which the positive electrode layer 1, in which the positive electrode active material layer 1B, the positive electrode current collector layer 1A, and the positive electrode active material layer 1B are sequentially laminated, and the margin layer 4 are formed on a main surface of the solid electrolyte layer 3 is obtained.

According to the same procedure, a negative electrode unit in which the negative electrode layer 2, in which the negative electrode active material layer 2B, the negative electrode current collector layer 2A, and the negative electrode active material layer 2B are sequentially laminated, and the margin layer 4 are formed on a main surface of the solid electrolyte layer 3 is obtained.

Then, the positive electrode unit and the negative electrode unit are alternately laminated such that respective one ends of both are offset to not coincide with each other, and the laminated body of the all-solid-state battery is fabricated. Further, the solid electrolyte layer may be formed on both ends of the laminated body in the laminating direction. For the positive electrode unit or the negative electrode unit to be disposed, the solid electrolyte layer 3 uses the outermost solid electrolyte layer 3B, and for a positive electrode unit or the negative electrode unit to be disposed therebetween, the solid electrolyte layer 3 uses the interlayer solid electrolyte layer 3A.

While the manufacturing method is to fabricate a parallel type all-solid-state battery, a method of manufacturing a serial type all-solid-state battery may be performed to laminate the positive electrode layer 1 and the negative electrode layer 2 such that respective one ends of both coincide with each other, while offset is not performed.

Further, adhesion can be enhanced by collectively pressing the fabricated laminated bodies through mold pressing, warm isostatic pressing (WIP), cold isostatic pressing (CIP), isostatic pressing, or the like. The pressing is preferably performed while heating, for example, at 40° C. to 95° C.

The fabricated laminated bodies are cut into chips using a dicing apparatus, and then, the laminated body of the all-solid-state battery is manufactured through debindering and firing.

In the debindering process, binder ingredients contained in the laminated body 20 are preheated and decomposed before firing, so that excessive and rapid decomposition of the binder ingredients in the firing process can be suppressed. In the debindering process, the fabricated laminated body 20 is placed on a ceramics setter for a pedestal, and, for example, the debindering process is performed within a temperature range of 300° C. to 800° C. for 0.1 to 10 hours under a nitrogen atmosphere. If it is a reducing atmosphere, the debindering process may be performed, for example, under an argon atmosphere or a nitrogen/hydrogen mixed atmosphere instead of the nitrogen atmosphere. In addition, if the current collector layer of the metal does not oxidize, a reducing atmosphere containing a small amount of oxygen may be used.

In the firing, for example, the sintered body can be obtained by performing heat treatment at a temperature range of 600° C. to 1000° C. under a nitrogen atmosphere. A firing time is, for example, 0.1 to 3 hours. If it is a reducing atmosphere, the firing may be performed, for example, under an argon atmosphere or a nitrogen/hydrogen mixed atmosphere instead of the nitrogen atmosphere.

Here, in order to fabricate the laminated body 20 having a desired warp, various methods can be taken. For example, a method of disposing a ceramics setter for a lid to control an amount of curvature at a height position $h_1$, which is the sum of a height increase Δh corresponding to a desired warp angle after firing to a height of a side surface of the laminated body before firing (a height $h_0$ of the side surface of the laminated body from the ceramics setter for a pedestal), and preventing the laminated body from warping any further by using the knowledge that the warp is likely to occur when rapid firing is performed in the firing process can be used. In this method, a gap is provided between the ceramics setter for a lid and the laminated body to form a desired warp angle. Further, the height position $h_1$ at which the ceramics setter for a lid is disposed is a height position in consideration of a shrinkage percentage of the laminated body after firing. The height position of the ceramics setter for a lid can be easily adjusted by disposing the laminated body for adjusting a height on four corners of the ceramics setter for a pedestal. For example, when a gap between the laminated body before firing and the ceramics setter for a lid is to be 10 μm, the laminated body for adjusting a height greater than that of the laminated body before firing by a thickness of 10 μm may be provided. In addition, the rapid firing is firing performed with a rate of temperature rise, for example, 1000° C./hour or more. In addition, the ceramics setter used for a pedestal and a lid is preferably a flat ceramics setter in order to further control the warp. For example, the ceramics setter in which a main surface of the ceramics setter is polished can be used. Further, the ceramics setter may be a dense substrate or may be a porous substrate having holes. As a material, a material with a sintering temperature higher than a firing temperature of the laminated body is preferable, for example, zirconia, alumina, or the like, is preferable.

In addition, by changing the thickness of the outermost solid electrolyte layer 3B of the laminated body 20 on the sides of the side surface 5A and the side surface 5B, there may be a difference in firing shrinkage rate between the outermost solid electrolyte layers of the side surface 5A and the side surface 5B, and the laminated body 20 having a desired warp may be fabricated.

The sintered body may be inserted into a cylindrical container together with a polishing agent such as alumina or the like, and then, barrel finishing may be performed. Accordingly, corners of the laminated body can be chamfered. The laminated body may be polished by sandblast as another method.

(Forming of Terminals)

The first external terminal 6 and the second external terminal 7 are attached to the sintered laminated body 20 (the sintered body). The first external terminal 6 and the second external terminal 7 are formed to come into electrical contact with the positive electrode layer 1 and the negative electrode layer 2, respectively. For example, the first external terminal 6 and the second external terminal 7 can be formed on the positive electrode layer 1 and the negative electrode layer 2 exposed from the side surface of the sintered body by known means such as sputtering, dip coating, screen printing, spray coating, or the like.

When the terminals are formed only in a predetermined portion, they are formed after masking with a tape, for example.

Hereinabove, while the embodiment of the present invention has been described in detail with reference to the accompanying drawings, the components and combinations thereof in the embodiment are exemplary, and additions, omissions, substitutions, and other modifications may be made without departing from the spirit of the present invention.

For example, in the laminated body 20 shown in FIG. 2, while the electrode layer is not exposed to the second side surface, at least one of the positive electrode layer 1 and the negative electrode layer 2 may be exposed to the second side surface.

EXAMPLES

Example 1

(Fabrication of Paste for Solid Electrolyte Layer)

With respect to 100 parts of the $Li_{1.3}Al_{0.3}Ti_{1.7}(PO_4)_3$ powder, 100 parts of ethanol and 200 parts of toluene were added as a solvent and wet mixed with a ball mill. After that, 16 parts of a binder and 4.8 parts of benzylbutyl phthalate as a plasticizer were further added and mixed to prepare an outermost solid electrolyte layer paste.

The paste for a solid electrolyte layer was formed in a sheet shape using a PET film as a base material through a doctor blade method, and the outermost solid electrolyte layer sheet and the interlayer solid electrolyte layer sheet were obtained. Both of the thicknesses of the outermost solid electrolyte layer sheet and the interlayer solid electrolyte layer sheet were set to 20 μm.

(Fabrication of Paste for Positive Electrode Active Material Layer and Paste for Negative Electrode Active Material Layer)

In the paste for a positive electrode active material layer and the paste for a negative electrode active material layer, after mixing $Li_3V_2(PO_4)_3$ in a predetermined weight ratio, 15 parts of a binder and 65 parts of dihydroterpioneol as a solvent were added to 100 parts of the powder, and they were mixed and distributed to fabricate the paste for a positive electrode active material layer and the paste for a negative electrode active material layer.

(Fabrication of Paste for Positive Electrode Current Collector Layer and Paste for Negative Electrode Current Collector Layer)

In the paste for a positive electrode current collector layer and the paste for a negative electrode current collector layer, 100 parts of Cu as a current collector, 10 parts of a binder, and 50 parts of dihydroterpioneol as a solvent were mixed and distributed to fabricate the paste for a positive electrode current collector layer and the paste for a negative electrode current collector layer.

(Fabrication of Electrode Unit)

The positive electrode unit and the negative electrode unit were fabricated as follows.

A paste for an active material was printed on the interlayer solid electrolyte layer sheet to a thickness of 5 μm through screen printing. Next, the printed paste for an active material was dried, and a paste for a current collector was printed thereon to a thickness of 5 μm through screen printing. Next, the printed paste for a current collector was dried, and further, a paste for an active material was printed thereon again to a thickness of 5 μm through screen printing. The printed active material paste was dried, and then, a PET film was separated. In this way, a sheet of an electrode unit in which the paste for an active material, the paste for a current collector, and the paste for an active material were sequentially printed and dried on the interlayer solid electrolyte layer sheet was obtained.

(Fabrication of Laminated Body)

The outermost solid electrolyte layer sheet was stacked, and 30 electrode units (15 positive electrode units and 15 negative electrode units) were alternately stacked on top of it via an interlayer solid electrolyte 3A. Here, the units were shifted and stacked on top of each other such that current collector paste layers of the odd number of electrode units extend only to one end surface, and current collector paste layers of the even number of electrode units extend only to the other end surface. The solid electrolyte layer sheet for an outermost solid electrolyte layer 3B was stacked on the stacked unit. After that, this was formed by thermo-compression bonding, and then cut to fabricate the laminated chip. A chip size was first side surface (W)×second side surface (L)×height (H)=4.1 mm×6.0 mm×2.0 mm. Accordingly, W:L, which is an aspect ratio of the chip, was approximately 1:1.5.

Next, the laminated chips were placed on a ceramics setter for a pedestal, a ceramics setter for a lid was installed at a height position at which an average angle of a warp A1 when seen from the side of a first side surface and a warp A2 when seen from the side of a second side surface was 0.5°, and then, the laminated chips were simultaneously fired to obtain the laminated body 20. Further, the laminated bodies for adjusting a height greater than a thickness of the laminated chip after firing by 14 μm were disposed on four corners of the ceramics setter for a pedestal, and the ceramics setter for a lid was installed thereon. In the simultaneous firing, a firing temperature was increased to 840° C. at a rate of temperature rise of 1000° C./hour under a nitrogen atmosphere, held at the temperature for two hours, and then naturally cooled after firing.

(Evaluation of Amount of Curvature)

The obtained laminated body (sintered body) was placed on a flat stand as shown in FIG. 3, photographing was performed in an x direction, and a warp angle A1 was acquired through image processing. Similarly, as shown in FIG. 4, photographing was performed in a y direction, and a warp angle A2 was acquired through image processing.

(Fabrication and Evaluation of all-Solid-State Secondary Battery)

The first external terminal and the second external terminal were attached to the sintered laminated body (sintered body) to fabricate the all-solid-state secondary battery through a known method.

The first external terminal and the second external terminal were sandwiched between spring probes to face each other, and an initial discharge capacity of the all-solid-state secondary battery and a capacity maintenance rate (cycling characteristics) after 1000 cycles were measured by performing a charge/discharge test. In the measurement condition, both currents upon charge and discharge were 0.2 C, and final voltages upon charge and discharge were 1.6 V and 0 V, respectively. The results are shown in Table 1. Further, a capacity at the time of a first discharge was set as an initial discharge capacity. In addition, a capacity maintenance rate was obtained by dividing the discharge capacity at the $1000^{th}$ cycle by the initial discharge capacity.

The results are shown in Table 1.

TABLE 1

| | Warp angle (°) | | | |
| --- | --- | --- | --- | --- |
| | Warp when seen from side of first side surface (A1) | Warp when seen from side of second side surface (A2) | Average | Cycle characteristics (%) |
| Comparative Example 1 | 0.0 | 0.0 | 0.0 | 81 |
| Comparative Example 2 | 0.2 | 0.2 | 0.2 | 82 |
| Example 1 | 0.6 | 0.4 | 0.5 | 87 |
| Example 2 | 1.2 | 0.8 | 1.0 | 92 |
| Example 3 | 2.0 | 1.5 | 1.8 | 93 |
| Example 4 | 2.2 | 1.9 | 2.1 | 92 |
| Example 5 | 3.0 | 2.0 | 2.5 | 92 |
| Example 6 | 3.5 | 3.0 | 3.3 | 91 |
| Example 7 | 4.0 | 3.0 | 3.5 | 91 |
| Example 8 | 4.5 | 3.5 | 4.0 | 90 |
| Example 9 | 7.0 | 2.0 | 4.5 | 88 |
| Example 10 | 8.0 | 2.0 | 5.0 | 86 |
| Comparative Example 3 | 7.0 | 6.0 | 6.5 | 73 |
| Comparative Example 4 | 9.0 | 1.0 | 5.0 | 72 |
| Example 11 | 1.5 | 1.5 | 1.5 | 92 |
| Example 12 | 2.0 | 2.0 | 2.0 | 93 |
| Example 13 | 3.0 | 3.0 | 3.0 | 92 |
| Comparative Example 5 | 6.0 | 6.0 | 6.0 | 78 |
| Example 14 | 1.2 | 0.8 | 1.0 | 93 |
| Example 15 | 2.0 | 1.5 | 1.8 | 93 |
| Example 16 | 2.5 | 2.0 | 2.3 | 92 |
| Example 17 | 3.0 | 2.0 | 2.5 | 93 |
| Example 18 | 3.3 | 2.7 | 3.0 | 92 |

Example 2 to Example 8

In Example 2 to Example 8, all-solid-state secondary batteries were fabricated similarly to in Example 1 except that laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 1.0°, 1.8°, 2.1°, 2.5°, 3.3°, 3.5°, and 4.0°. The warp A1 when seen from the side of the first side surface and the warp A2 when seen from the side of the second side surface are shown in Table 1.

Example 9 to Example 10

In Example 9 to Example 10, all-solid-state secondary batteries were fabricated similarly to in Example 1 except that chips with aspect ratios W:L of 1:3.5 and 1:4.0 were used, laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 4.5° and 5.0°. The warp A1 when seen from the side of the first side surface and the warp A2 when seen from the side of the second side surface are as follows as shown in Table 1.

Example 11 to Example 13

Also in Example 11 to Example 13, all-solid-state secondary batteries were fabricated similarly to in Example 1 except that chips with an aspect ratio W:L of 1:1 were used, laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 1.5°, 2.0°, and 3.0°. The warp A1 when seen from the side of the first side surface and the warp A2 when seen from the side of the second side surface are as follows as shown in Table 1.

Example 14 to Example 18

Also in Example 14 to Example 18, all-solid-state secondary batteries were fabricated similarly to in Example 1 except that chips with a chip size of first side surface (W)×second side surface (L)×height (H)=3.0 mm×4.4 mm×1.1 mm (accordingly, chips with an aspect ratio W:L of 1:1.5) were used, laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 1.0°, 1.8°, 2.3°, 2.5°, and 3.0°. The warp A1 when seen from the side of the first side surface and the warp A2 when seen from the side of the second side surface are as follows as shown in Table 1.

Comparative Example 1 to Comparative Example 2

In each of Comparative Example 1 to Comparative Example 2, all-solid-state secondary batteries were fabricated similarly to in Example 1 except that laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 0° and 0.2°. The warp A1 when seen from the side of the first side surface and the warp A2 when seen from the side of the second side surface are shown in Table 1.

Comparative Example 3 to Comparative Example 4

In Comparative Example 3 to Comparative Example 4, all-solid-state secondary batteries were fabricated similarly to in Example 1 except that chips with aspect ratios W:L of 1:1.2 and 1:9.0 were used, laminated chips were placed on ceramic stands, and laminated bodies for adjusting heights and ceramics setters for lids were installed at height positions at which average angles of a warp A1 when seen from the side of the first side surface and a warp A2 when seen from the side of the second side surface were 6.5° and 5.0°. The warp A1 when seen from the side of the first side surface and the warp A2 when seen from the side of the second side surface are shown in Table 1.

Comparative Example 5

In Comparative Example 5, an all-solid-state secondary battery was fabricated similarly to in Example 11 except that the same chips as the chips used in Example 11 to 13 were used, laminated chips were placed on ceramic stands, and laminated bodies for adjusting heights and ceramics setters for lids were installed at height positions at which an average angle of a warp A1 when seen from the side of the first side surface and a warp A2 when seen from the side of the second side surface was 6.0°. The warp A1 when seen from the side of the first side surface and the warp A2 when seen from the side of the second side surface are as follows as shown in Table 1.

Based on the results shown in Table 1, in Examples 1 to 18 in which the average angles of the warp A1 when seen from the side of the first side surface and the warp A2 when seen from the side of the second side surface were 0.5° or more and 5.0° or less, and the angle of the warp A1 when seen from the side of the first side surface was 8.0° or less, cycling characteristics of 86% or more were obtained.

On the other hand, when the average angles of the warp A1 when seen from the side of the first side surface and the warp A2 when seen from the side of the second side surface were less than 0.5° (Comparative Examples 1 and 2), or when the average angles of the warp A1 when seen from the side of the first side surface and the warp A2 when seen from the side of the second side surface were larger than 5.0 (Comparative Examples 3 and 5), cycling characteristics were 82% or less.

In addition, even when the average angle is 5.0°, in Comparative Example 4 in which an angle of the warp A1 when seen from the side of the first side surface exceeds 8.0°, cycling characteristics were 72%.

In Examples 1 to 8 and Examples 11 to 18 in which the average angles of the warp A1 when seen from the side of the first side surface and the warp A2 when seen from the side of the second side surface were 0.5° or more and 4.0° or less, cycling characteristics of 90% or more were obtained. Further, in these examples, the angle A1 of the warp when seen from the side of the first side surface was 4.5° or less.

It was found that while Examples 1 to 6, Examples 11 to 13, and Examples 14 to 18 have different chip sizes and/or aspect ratios, those with substantially the same average angle of the warp have substantially the same cycling characteristics.

INDUSTRIAL APPLICABILITY

According to the present invention, it is possible to provide an all-solid-state secondary battery with good cycling characteristics while a warp with a predetermined angle is provided.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
6 First external terminal
7 Second external terminal
20 Laminated body
100 All-solid-state secondary battery

What is claimed is:

1. An all-solid-state secondary battery comprising:
a laminated body in which a positive electrode layer having a positive electrode current collector layer and a positive electrode active material layer, and a negative electrode layer having a negative electrode current collector layer and a negative electrode active material layer are laminated via a solid electrolyte layer;
a first external terminal; and
a second external terminal,
wherein the laminated body has a first side surface parallel to a laminating direction and a second side surface parallel to the laminating direction and perpendicular to the first side surface,
the first external terminal and the second external terminal are connected to the first side surface, and
the laminated body has a warp that is warped in the laminating direction and satisfies Equations (1) and (2):

$$0.5° \leq ((A1+A2)/2) \leq 5° \quad (1)$$

$$A1 \leq 8.0° \quad (2),$$

where A1 is an angle of the warp of the laminated body when seen from a side of the first side surface, and A2 is an angle of the warp of the laminated body when seen from a side of the second side surface.

2. The all-solid-state secondary battery according to claim 1, wherein Equation (3) is satisfied:

$$0.5° \leq ((A1+A2)/2) \leq 4° \quad (3).$$

3. The all-solid-state secondary battery according to claim 1, wherein the solid electrolyte layer is at least one selected from the group consisting of a Perovskite type compound, a Lisicon type compound, a Garnet type compound, a Nasicon type compound, a Thio-Lisicon type compound, a glass compound, and a phosphate compound.

* * * * *